E. Barrett.
Lenses for Lanterns.
№ 71441      Patented Nov. 26, 1867
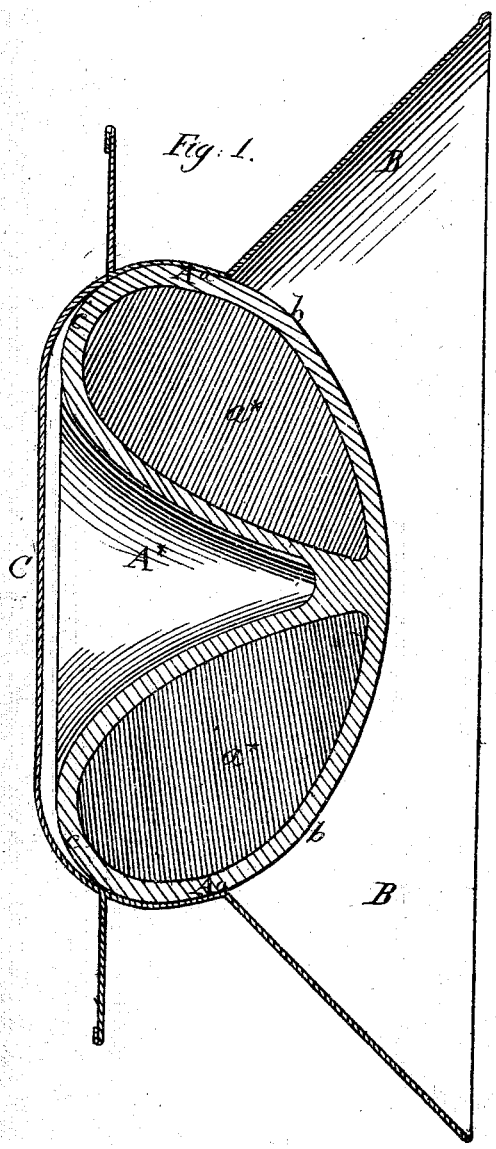
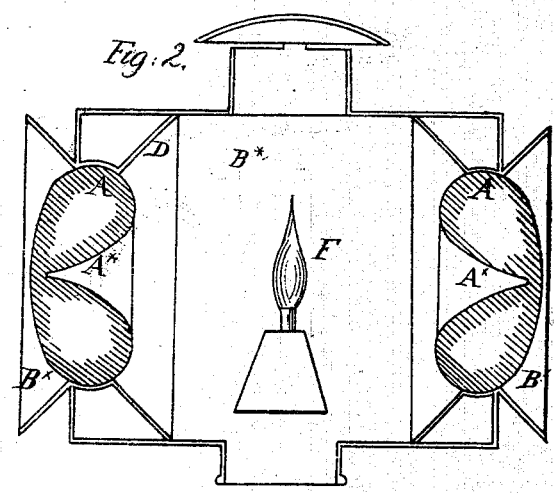
Witnesses:
Lawrence Holmes
A. Kellers
Inventor:
Edmund Barrett

United States Patent Office.

EDWARD BARRETT, OF NEW YORK, N. Y., ASSIGNOR TO HIMSELF AND JOHN F. BURNS, OF THE SAME PLACE.

*Letters Patent No. 71,441, dated November 26, 1867.*

IMPROVEMENT IN LENSES FOR LANTERNS.

*The Schedule referred to in these Letters Patent and making part of the same.*

TO ALL WHOM IT MAY CONCERN:

Be it known that I, EDWARD BARRETT, commander in the United States Navy, official residence in the city, county, and State of New York, have invented certain new and useful Improvements in Lenses for Signal and other Lanterns; and I do hereby declare that the following is a full, clear, and exact description of the same, reference being had to the accompanying drawings, making a portion of this specification, in which—

Figure 1 is a transverse section of a lens made according to my invention.

Figure 2 is a vertical transverse section, showing one method of employing the lens in a lamp or lantern.

Similar letters of reference indicate corresponding parts in both figures.

The object of this invention is to provide a lens for signal and other lanterns, lamps, or lights, which, when used simply as a lens, will refract the light with greater power or brilliancy than those ordinarily in use, and which may also be employed, when desired, as a reflector; and to this end the invention consists in a lens of novel construction, whereby a superior refraction of the light is secured; also in the combination of an opaque cover or back with the aforesaid lens, whereby the same may be employed, when desired, as a simple reflector; also in the combination, with the said lens, of a surrounding deflector, of flaring form, whereby the rays refracted or reflected, as the case may be, by the lens, are cast in the desired direction without loss of brilliancy.

To enable others to understand the nature and construction of my invention, I will proceed to describe it with reference to the drawings.

The lens marked A, in the drawings, is hollow, and made of glass, blown or moulded into the requisite shape, and is filled with any suitable liquid, tinged by proper materials to any desired color or shade, preferably blue, as represented at $a^*$, the intensity of the color being varied according to the degree to which it is intended to affect the light passing through or reflected from the lens, as hereinafter fully set forth. The outer side or surface of the lens A is made convex, as indicated at $a\ b\ b\ a$, the central part $b\ b$ of the said surface being flatter than the circumferential portions $a\ b$ thereof, or, in other words, the surface mentioned is of oblate spheroidal form. The opposite side or surface of the lens has its annular circumferential portion $c$ made semicircular in its cross-section, while, provided at the central part of the said side of the lens, is a deep bell-shaped cavity, $A^*$, which extends inward nearly to the forward side of the lens, as shown in the drawings, the sides of the said cavity bulging inwards on a moderate curvature. Placed around the forward or convex surface of the lens is a flaring deflector, B, made of any suitable reflecting material. Fitted upon the inner or hollowed side of the lens is a back or cover, C, of any appropriate opaque material, which is designed to keep the light from the aforesaid side of the lens, when the said lens is used simply for reflecting purposes, and which is detached therefrom when the same is used simply for the refraction of light. The back or cover just mentioned being removed from the lens, the light passing through the nearly annular sides thereof, is thrown or directed against the reflecting-surface of the deflector B, in such manner that the said deflector is enabled to reflect and concentrate the light in the desired direction, thereby effectually preventing any scattering or practical waste of light, the light being furthermore tinged by the coloring of the liquid at $a^*$, with which the lens is filled, when the back or cover is applied to the inner surface of the lens, as hereinbefore set forth, the forward surface thereof will reflect the light in a manner similar to that of an ordinary reflector. It is designed to use the lens, not only in single, signal, or other lanterns or lights, but also, when desirable, to so arrange a number of lenses in a single lantern, $B^*$, as to adapt the latter to the use of a number of artisans or others occupying positions adjacent to each other, in which case the lenses are arranged so that one lens will be situated immediately opposite another, as shown in fig. 2, each lens having placed around it, at its inner side, a supplemental flaring deflector, D, which deflects whatever light may be thrown beyond the circumference of the lens directly to the lens opposite, thereby insuring the utilization of all the light emanating from the gas or other flame or jet F, placed centrally in the lantern, as shown in the figure last mentioned.

What I claim as my invention, and desire to secure by Letters Patent, is—

1. The lens constructed with the cavity $A^*$, substantially of the form set forth, for the purpose specified.

2. The combination of the opaque cover or back with the lens, constructed as described, whereby the lens may be used as a reflector, substantially as herein set forth.

3. The combination, with the within-described lens, of the reflector B, of flaring form, substantially as and for the purpose specified.

EDWARD BARRETT.

Witnesses:
   A. LE CLERC,
   CHAS. H. ASHTON.